(No Model.)
W. & J. C. HANCOCK & E. SCHOLES.
ELASTIC WHEEL TIRE.
No. 605,546. Patented June 14, 1898.
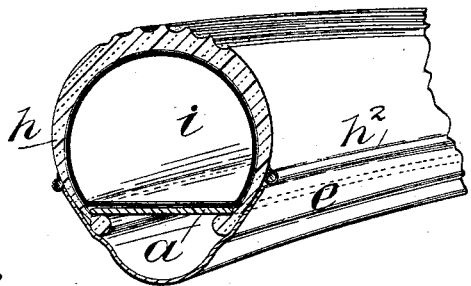
FIG. 1.
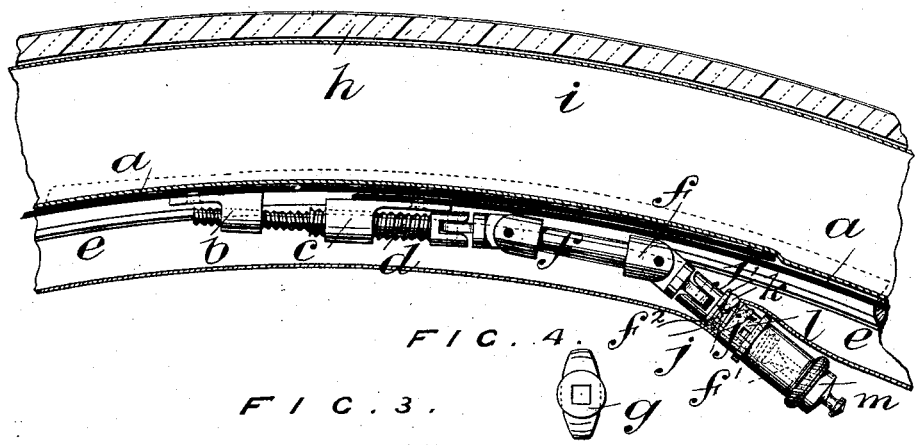
FIG. 2.
FIG. 3. FIG. 4.
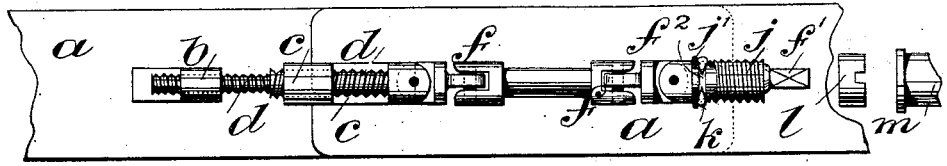
FIG. 5. FIG. 6.
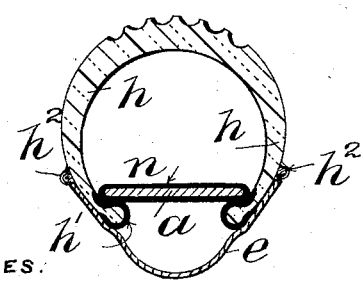 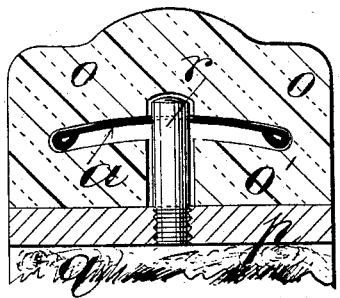
WITNESSES.
Otto Munk
John F. Townsend
INVENTORS,
William Hancock, John Charles Hancock,
& Edmondson Scholes.
By their Attorneys, Richards & Co.

UNITED STATES PATENT OFFICE.

WILLIAM HANCOCK, JOHN CHARLES HANCOCK, AND EDMONDSON SCHOLES, OF HOLLINWOOD, ENGLAND, ASSIGNORS OF TWO-FIFTHS TO JOHN EDWARD LEES AND FREDERICK NEWTON TWEEDALE, OF OLDHAM, ENGLAND.

ELASTIC WHEEL-TIRE.

SPECIFICATION forming part of Letters Patent No. 605,546, dated June 14, 1898.

Application filed January 25, 1898. Serial No. 667,868. (No model.)

*To all whom it may concern:*

Be it known that we, WILLIAM HANCOCK, JOHN CHARLES HANCOCK, and EDMONDSON SCHOLES, subjects of the Queen of Great Britain, and residents of Hollinwood, in the county of Lancaster, England, have invented certain new and useful Improvements in Elastic Wheel-Tires, of which the following is a specification.

Our said invention relates to improvements in or connected with elastic wheel-tires, and refers particularly to the method of securing the outer covers of pneumatic tires.

Previous to our invention it has been proposed to secure the outer covers of pneumatic tires in position upon the rim by means of an encircling extensible flat band or ribbon of steel or other metal or material. The outer cover is formed with thickened edges, which are disposed beneath the edges of the band, so that upon the band being contracted in diameter the cover is firmly gripped between the band and the rim. The difficulty in carrying out successfully this method of securing the covers of pneumatic tires has been in providing means whereby the encircling band may be readily contracted and expanded in diameter, and which shall also firmly secure the band when contracted in position, so that it will not "creep" or rub against the edges of the cover. The object of our invention is to overcome these defects, and thus enable this method of securing the covers of pneumatic tires to be successfully carried out.

Our invention will be more fully understood with reference to the accompanying sheet of drawings, in which—

Figure 1 shows a cross-section of a wheel rim and tire in which the outer cover is held in position by means of an encircling band or ribbon. Fig. 2 is a sectional elevation of a portion of the wheel rim and tire, showing our improved method of operating and locking the ribbon. Fig. 3 is a plan of the under side of the ribbon and locking means. Fig. 4 shows a plan view of the key for operating the locking mechanism. Fig. 5 shows a method of applying the extensible flat ribbon to a single-tube tire. Fig. 6 indicates in cross-section an arrangement whereby the extensible flat ribbon can be utilized for securing solid-rubber tires upon the rims of carriage and other vehicle wheels.

In carrying our invention into effect we provide each overlapping end of the extensible encircling band $a$ with a nut $b$ $c$. A screwed spindle $d$ engages with these nuts $b$ $c$, one portion of the spindle being reduced in diameter, as shown in the drawings. The screwed spindle $d$ is formed with right and left hand screw-threads, so that on revolving the spindle the two ends of the band $a$ are advanced or retracted from each other, thus causing the diameter of the band to be correspondingly contracted or expanded.

It will be noted from an inspection of Fig. 2 that the screwed spindle $a$ is disposed within the rim $e$ and below the extensible ribbon $a$. To operate the screwed spindle $d$, we provide a flexible connection $f$, the end of which projects through the rim $e$ and is formed with a nut $f'$. By revolving the flexible connection $f$ by means of a key $g$ (shown in plan view in Fig. 4) the metallic band $a$ may be readily contracted or expanded in diameter, as required. The thickened edges of the outer cover $h$, inclosing the air-bag $i$, are introduced beneath the edges of the ribbon $a$ when the same is expanded. The screwed spindle $d$, engaging with the nuts $b$ $c$, formed on the under side of the band $a$, provides a positive locking arrangement for any desired diameter of the band $a$. By operating the screwed spindle $d$ by means of the key $g$ the diameter of the band $a$ may be reduced, so that it firmly grips the edges of the outer cover $h$, and both the band $a$ and the cover $h$ are prevented from slipping round the rim, or "creeping." We form the cover $h$ with beads $h^2$, which when resting on the edges of the rim $e$ serve as guides to indicate that the edges of the cover $h$ have been placed in position. The flexible connection $f$ is provided with universal or knuckle joints, as shown in Figs. 2 and 3, so as to facilitate the expansion and contraction of the metallic band $a$ and to enable the connection $f$ to revolve the screwed spindle from any angle.

If considered desirable, the screwed spindle $d$ may be provided with a flexible joint at some portion of its length.

To provide a bearing for the end of the flexible connection $f$ protruding beyond the rim $e$, we slit the rim by means of a suitable tool and form a circular aperture by forcing outward one portion of the rim, while the other portion is forced inward, as shown in Fig. 2. The end of a metallic sleeve $j$, formed with a half-collar $j'$, is passed through this circular opening in the rim $e$, and the outer end link $f'$ of the flexible connection $f$ is arranged to be revolved within the sleeve $j$. This end link $f'$ is formed with an annular groove $f^2$, with which engage the ends of a spring $k$, partly embracing the sleeve $j$, the ends projecting through holes $j^2$ formed therein. The half-collar $j'$ and spring $k$ are disposed within the rim $e$, as shown in Fig. 2.

The sleeve $j$ is formed with an external screw-thread, and a nut $l$, engaging therewith, secures the sleeve $j$ to the rim $e$, the spring $k$ abutting between the half-collar $j'$ and the inner part of the rim, thus preventing the withdrawal of the sleeve $j$, as will be apparent from an inspection of Fig. 2. The nut $l$ is cut or recessed, as shown in the drawings, so that the same may be operated by a suitable tool. The protruding link $f$ of the flexible connection $f$ can thus be freely revolved within the sleeve by means of the key $g$, while the ends of the spring $k$, engaging with the annular groove $f^2$, formed on the link $f'$, prevent any longitudinal movement of the link $f'$. A dust or weather cap $m$ is provided to engage with the screw-thread of the sleeve $j$ and shroud and protect the protruding end of the link $f'$ of the flexible connection $f$. A salient advantage in the use of such an extensible ribbon $a$ as described lies in the fact that no special section of rim is required, and the ribbon $a$ may therefore be readily applied to existing rims.

We do not confine ourselves to securing the outer covering of a pneumatic tire alone, as the retaining-band $a$ and improved means of operating the same may be used with a single-tube tire where an inner air-bag is dispensed with. To effect this, we propose to sheath the metallic band $a$ within a tube of india-rubber or similar material $n$, so as to provide a fluid-tight joint as well as a means of retaining the cover in position. The thickened edges of the cover $h$ are also inclosed in rubber or similar resilient material $h'$. A fluid-tight joint between the meeting edges of the rim $e$, cover $h$, and band $a$ is thus provided, as indicated in Fig. 5.

Our improved method of securing the covers of pneumatic tires may be applied to all descriptions of vehicles, such as velocipedes, motor-cars, and other vehicles. We wish it, however, to be understood that we do not confine ourselves to pneumatic tires, as our invention may be utilized to secure solid-rubber tires, such as are or may be chiefly used in vehicles of a heavy type, as shown in Fig. 6. In this case the base of the solid-rubber tire $o$ is formed with turned-in edges $o'$, which can be sprung open to permit of the insertion of the flat ribbon $a$. On resuming their normal position the turned-in edges serve to retain the ribbon $a$.

The ribbon or ring is contracted and expanded by the improved locking means, as already described, the rim $p$ and felly $q$ being bored out to accommodate the flexible connection $f$. When contracted, the ribbon $a$ firmly grips the turned-in edges of the solid-rubber tire $o$ and maintains the tire securely in position upon the rim.

When using the metallic or other ribbon to secure a solid-rubber tire upon a flat metal hoop or rim of a heavy vehicle, as shown in Fig. 6, in order to prevent the ribbon $a$ and tire $o$ from slipping off the flat rim $p$ we secure studs $r$ to the rim $p$, which studs project through slots formed in the ribbon $a$ and serve to maintain the ribbon $a$ and tire $o$ in position upon the flat rim $p$. This method is readily applicable to existing carriage-wheels. We might also utilize the band $a$ and operating means to secure pneumatic tires to the rims of existing carriage-wheels.

We declare that what we claim as our invention is—

1. The improved means for positively actuating and locking the extensible flexible ribbon $a$ for securing resilient tires, said means consisting of a screwed spindle formed with right and left hand threads engaging with nuts formed on or secured to said ribbon $a$ to which screwed spindle is secured a connection made flexible by means of universal joints, the outer protruding end of the flexible connection being arranged to revolve within a sleeve secured to the rim and operated by means of a key so as to revolve the screwed spindle whereby the flexible ribbon $a$ is expanded or contracted in diameter for the purposes and substantially as set forth.

2. In combination the ribbon $a$ for securing resilient tires, the nuts $b$ $c$ formed on or secured to the ribbon $a$ the screwed spindle $d$ formed with right and left hand screw-threads engaging with the nuts $b$ $c$, the flexible connection $f$ and protruding link $f'$ revolving within a sleeve $j'$ secured to the rim $e$, and dust-cap $m$ arranged and acting in the manner for the purposes and substantially as set forth.

In witness whereof we have hereunto set our hands in presence of two witnesses.

WILLIAM HANCOCK.
JOHN CHARLES HANCOCK.
EDMONDSON SCHOLES.

Witnesses:
JOSHUA ENTWISLE,
ALFRED YATES.